United States Patent
Niemi

(10) Patent No.: US 7,792,519 B2
(45) Date of Patent: Sep. 7, 2010

(54) CONFERENCING SYSTEM

(75) Inventor: Aki Niemi, Helsinki (FI)

(73) Assignee: Nokia Corporation, Epsoo (FI)

( * ) Notice: Subject to any disclaimer, the term of this patent is extended or adjusted under 35 U.S.C. 154(b) by 19 days.

(21) Appl. No.: 10/645,848

(22) Filed: Aug. 22, 2003

(65) Prior Publication Data
US 2004/0137887 A1    Jul. 15, 2004

(30) Foreign Application Priority Data
Aug. 28, 2002    (GB)    ................................. 0219947.9

(51) Int. Cl.
*H04W 4/08*    (2009.01)
(52) U.S. Cl. ........................ 455/416; 455/413; 370/260; 370/352; 709/204; 379/158; 379/88.17; 379/202.01
(58) Field of Classification Search ................. 455/416; 370/260, 352, 202.1; 379/202, 202.01, 202.1; 709/204
See application file for complete search history.

(56) References Cited

U.S. PATENT DOCUMENTS

| | | | |
|---|---|---|---|
| 6,104,706 A | 8/2000 | Richter et al. | |
| 6,501,739 B1 | 12/2002 | Cohen | |
| 6,577,622 B1 * | 6/2003 | Schuster et al. | 370/352 |
| 6,870,916 B2 * | 3/2005 | Henrikson et al. | 379/202.01 |
| 2001/0053131 A1 | 12/2001 | Geens | |
| 2002/0061779 A1 | 5/2002 | Maehiro | |
| 2002/0078153 A1 * | 6/2002 | Chung et al. | 709/204 |
| 2002/0093948 A1 | 7/2002 | Dertz et al. | |
| 2002/0098831 A1 * | 7/2002 | Castell et al. | 455/413 |
| 2003/0026214 A1 * | 2/2003 | Iveland et al. | 370/260 |
| 2003/0123488 A1 * | 7/2003 | Riikonen et al. | 370/503 |
| 2004/0037406 A1 * | 2/2004 | Gourraud | 379/202.01 |

FOREIGN PATENT DOCUMENTS

| | | |
|---|---|---|
| EP | 1 039 697 A1 | 9/2000 |
| EP | 1 294 165 A1 | 3/2003 |
| WO | WO 02/21816 A1 | 3/2002 |

* cited by examiner

*Primary Examiner*—Dwayne Bost
*Assistant Examiner*—Pierre-Louis Desir
(74) *Attorney, Agent, or Firm*—Ditthavong Mori & Steiner, P.C.

(57) ABSTRACT

A method for administering conferencing resources in a communications system comprising a plurality of terminals and a conference server, the method comprising: transmitting from a first terminal to the server a first message comprising a request for a resource capable of sustaining a conference call; allocating by means of the server a network address identifying a resource capable of sustaining the conference call; and transmitting from the server to the first terminal a second message comprising the network address.

36 Claims, 3 Drawing Sheets

CONFERENCING SYSTEM

FIELD OF THE INVENTION

The present invention relates to a method and apparatus for setting up conference calls in communication systems, and in particular but not exclusively to wireless communication systems.

BACKGROUND OF THE INVENTION

The concept of conference calls in public switched telephone networks (PSTN) is well known. PSTN conferences are typically set up by a first participant calling a specific customer support number and being supplied with a conference bridge number and a PIN code. The first participant can then provide this information to any other potential participants. The participants wishing to join the call would each dial the conference bridge number, and supply the PIN code on demand, and would subsequently be admitted to the conference call.

As an alternative, the Internet could conceivably be used to arrange conference calls. A specific web site could be accessed by a first participant, and a bridge number and PIN code could be obtained. The first participant would then be able to provide the details to other participants.

Both of these procedures allow for a mobile terminal to be involved in the conference call. However, both procedures have two main disadvantages. Firstly, a conference call must be planned in advance. The various participants must contact each other so that they each know when the call is due to take place and can dial the conference bridge number at that time. Secondly, the participants themselves need to organise for the bridge number and the PIN code to be distributed to all participants.

There have been various models proposed for providing conferencing services in third generation Internet Protocol Multimedia Subsystem (IMS) wireless communication systems, for example in IETF draft "Models for Multi Party Conferencing in SIP", J. Rosenberg and H. Schulzrinne. Each of the models in this draft uses Session Initiation Protocol (SIP) messaging. The SIP protocol is discussed in Internet Standards RFC 3261 and RFC 2543. Some of the models are described briefly below.

The first model, known as "end system mixing", requires that one terminal involved in a conference call performs the mixing (merging) of signals and media streams sent to and from other terminals in the call. FIG. 1a is a depiction of a three-way call using this model. In this example, users A and B are involved in a two-way call. At some point during the call, user A decides to bring user C into the call. To do this, user A calls user C using a completely separate SIP call. There is no call set up between B and C. Instead, A receives media streams from both B and C and mixes them. Terminal A sends a stream containing the streams of A and B to terminal C, and a stream containing A's and C's streams to terminal B. In this model, terminals B and C are unaware from a SIP perspective that the call involves more than two parties.

In the case of a call involving more than three terminals, more than one terminal may perform mixing and signalling to sustain the call. For instance, as an extension of the above-described example, user C may decide to invite a fourth user D into the conference call. User C would then call user D and terminal C would perform the mixing of the streams it receives from terminal A with its own stream, and send the combined stream to D, and mix its own stream with that of D and send this to A. This set-up is shown in FIG. 1b.

Serious disadvantages of this model are that when a mixing terminal leaves the call, the conference must end, and that there is no way for a mixing terminal to determine whether a signalling message sent to it was intended for that terminal alone or for all terminals in the conference.

A further model, using dial-in conference servers, closely mirrors the PSTN system described above. One participant defines a URI (uniform resource identifier) to identify a conference call, and sends it to other participants. The participants then each call the server, using the conference URI, which maintains point-to-point SIP relationships with each participant that calls in. The server receives media from each participant, mixes them, and sends out the appropriate mixed stream to each participant separately. This model is depicted in FIG. 2, which shows four users A-D taking part in a conference call.

Dial-in conference servers are versatile in that they can be used for pre-arranged conferences or for ad hoc conferences. However, this model suffers from the fact that it is possible for the same URI to be used for more than one conference. This would cause conference sessions to be mixed.

It is an object of the present invention to provide a solution to one or more of the above-stated problems.

SUMMARY OF THE INVENTION

According to a first aspect of the present invention there is provided a method for administering conferencing resources in a communications system comprising a plurality of terminals and a conference server, the method comprising: transmitting from a first terminal to the server a first message comprising a request for a resource capable of sustaining a conference call; allocating by means of the server a network address identifying a resource capable of sustaining, the conference call; and transmitting from the server to the first terminal a second message comprising the network address.

Advantageously, the method allows for conferences to be set up on an ad hoc basis so that the conferences need not be pre-arranged. In addition, the method prevents the problem of overlapping conference sessions. This problem is overcome by providing for a server to allocate a resource for a conference, and a corresponding address for that resource. In this way, an address can be unique to a particular conference at a given time.

A further advantage of the present invention is that it allows for the use of standard SIP messages in the establishment of a conference call. Furthermore, no significant user configuration is required in the allocation of conferencing resources.

Preferably a user transmits the network address from the first terminal to terminals of other users that will take part in the conference call. Preferably connections are initiated between the terminals and the network address to establish the conference call.

According to a second aspect of the present invention there is provided a conference server for administering conferencing resources in a communications system comprising a plurality of terminals, the conference server comprising: a receiver unit for receiving from a first terminal a first message comprising a request for a resource capable of sustaining a conference call; an allocation unit for allocating a network address identifying a resource capable of sustaining the conference call; and a transmission unit for transmitting to the first terminal a second message comprising the network address.

Preferably the receiving unit is arranged to receive from a first terminal a first message comprising a request for a resource capable of sustaining a conference call. Preferably the allocation unit is arranged to allocate a network address identifying a resource capable of sustaining the conference call. Preferably the transmission unit is arranged to transmit to the first terminal a second message comprising the network address.

The server could be provided at a single location, or by functionality that is distributed between two or more locations.

According to a third aspect of the present invention there is provided a communications system comprising: a conference server for administering conferencing resources in a communications system comprising a plurality of terminal, the conference server comprising: a receiver unit for receiving from a first terminal a first message comprising a request for a resource capable of sustaining a conference call; an allocation unit for allocating a network address identifying a resource capable of sustaining the conference call; and a transmission unit for transmitting, to the first terminal a second message comprising the network address; and a plurality of terminals including the first terminal.

BRIEF DESCRIPTION OF DRAWINGS

The present invention will now be described by way of example with reference to the accompanying drawings in which.

DETAILED DESCRIPTION OF THE INVENTION

The invention is described hereinbelow with reference to a non-limiting embodiment.

In particular, the invention is described in relation to SIP signalling in a 3G IMS mobile communications network. However, the invention is not limited to such signalling or such a network.

Figure 1A:
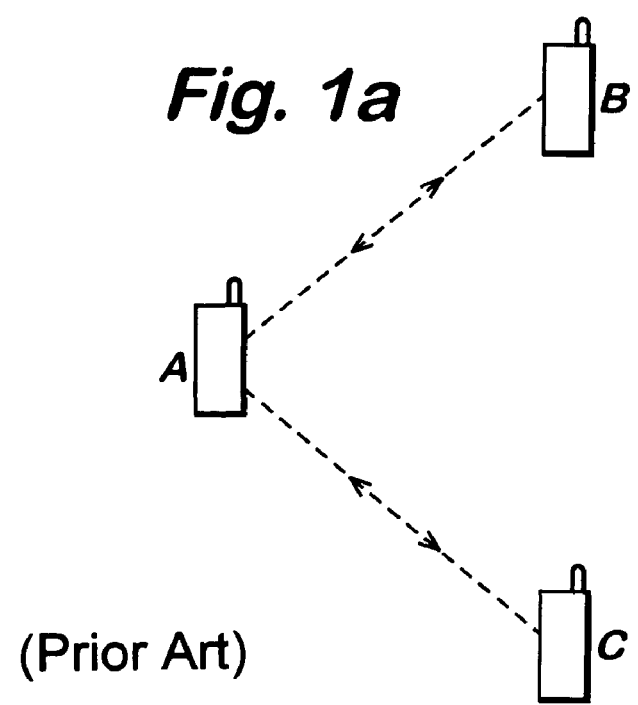
FIG. 1 shows a prior art model for a conferencing system.
Figure 1B:
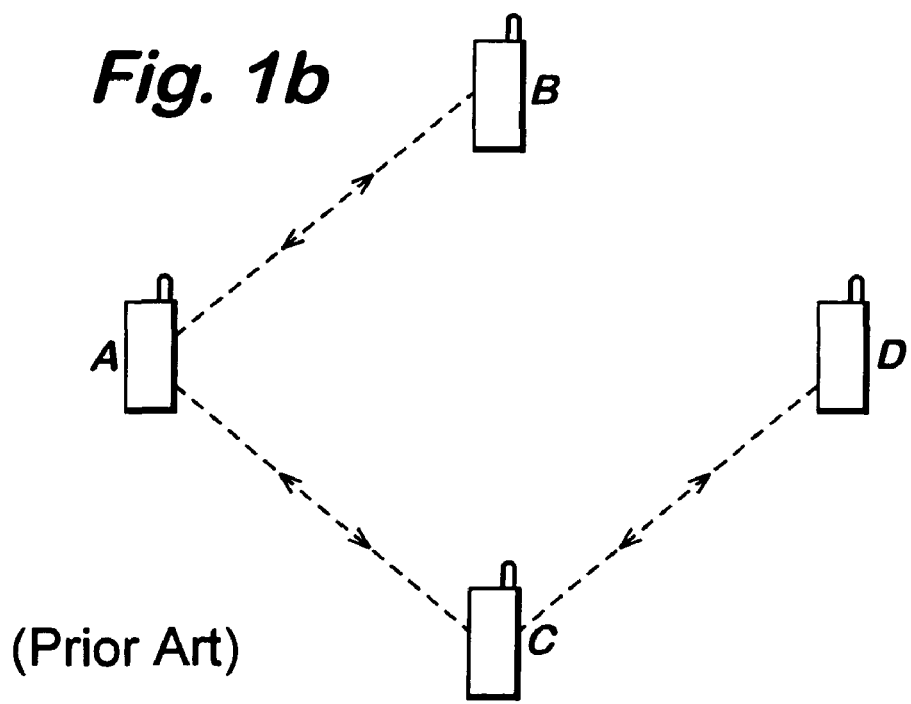
Figure 2:
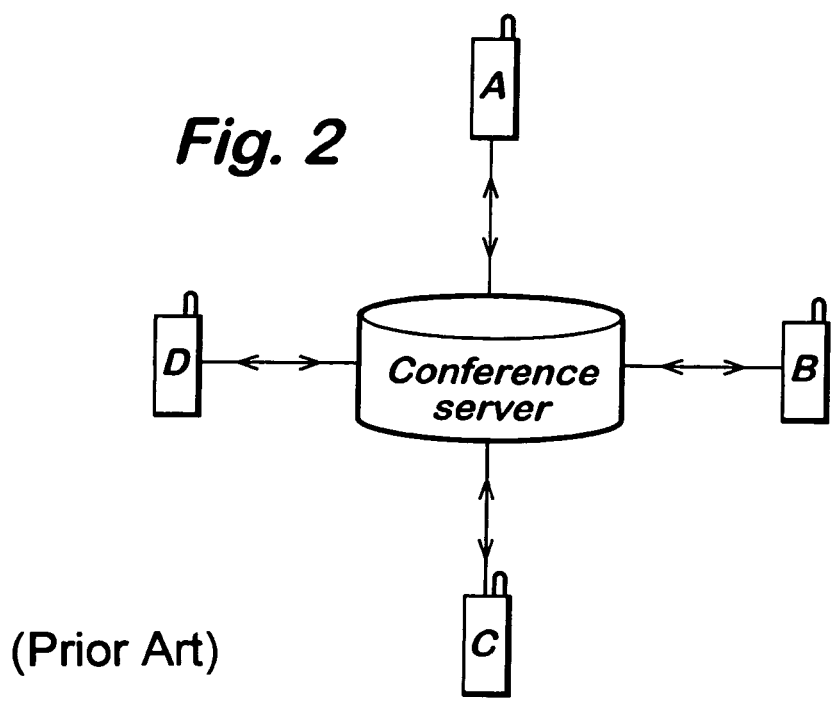
FIG. 2 shows a prior art dial-in conferencing system.
Figure 3:
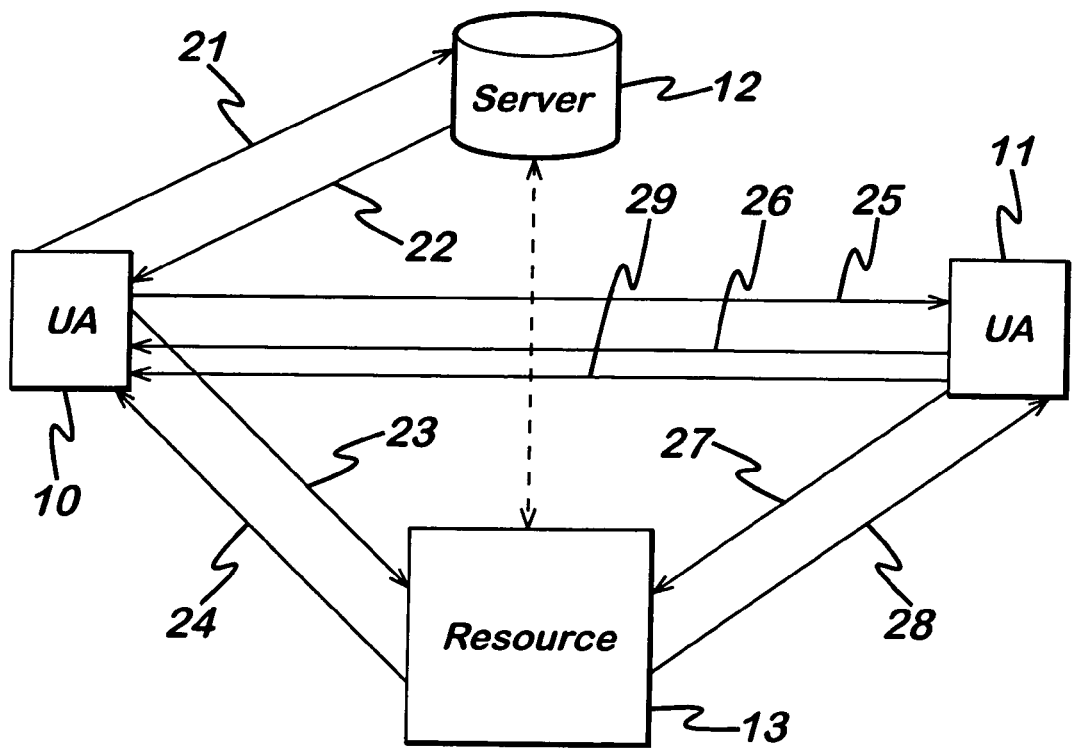
FIG. 3 shows a conferencing system according to the invention.

Referring to FIG. 3, two user agents 10 and 11 are shown. A first user, using user agent 10, wishes to start a conference call involving user agent 11 and sends a SIP INVITE message 21 to a well-known URI at an operator to initiate the conferencing process. That URI could be stored by the user agent 10. The INVITE message 21 indicates that user agent 10 wishes to initiate a conference, and the Request-URI could suitably take the form:
sip:conferences@sonera.fi The INVITE message could include details of the type of conference required, for example a preferred data rate. These details could be contained in the media components listed in the Session Description Protocol (SDP) payload of the INVITE 21.

The message 21 is received at a conference server 12 which is preferably a generic user agent server. At this stage, the server 12 could authenticate the conference request by transmitting a SIP message containing an authentication challenge to the user agent 10 requesting details such as a username and a password. In this case, the user would then need to provide such details, i.e. valid authentication credentials, in order for the conference request to be authorised.

Either in response to receiving message 21, or in response to receiving valid authentication information from user agent 10, the server 12 allocates a dynamic SIP URI to be used for the requested conference. The dynamic URI identifies a resource 13 that is available to be used for supporting the requested conference according to the specifications listed by the first user in the INVITE 21. The network is arranged to route to the resource, or the unit that provides the resource, communications directed to that address. To facilitate this the server is preferably arranged to allocate addresses for conferencing according to a pre-set pattern so that they will all refer to a suitable conferencing resource. The server 12 may reserve this resource so that it remains available until the requested conference begins. Alternatively, no resource may be reserved by the server 12 but instead an available resource could be located at the time when the requested conference is initiated. The resource is capable of establishing point-to-point connections with a terminal of each participant in a conference call. It can merge the traffic signals it receives from each terminal and transmit the merged signals to the other terminals that are parties to the conference call. Those traffic signals could carry voice data or other data such as video or graphical (e.g. whiteboarding) data. The resource could be data handling capacity, bandwidth or any other resource necessary for sustaining a conference call. The resource could be provided by physical equipment such as a part of a server.

The dynamic URI is transmitted to user agent 10 by conference server 12 in a SIP message 22. The message 22 is preferably a redirection message with a code in the 3xx range, and the URI is preferably contained in the contact field of the message. An examples of the form that the contact field could suitably take is:
Contact: <sip:DKLSKX87KKJ989SHFKJH@conference.sonera.fi>

On receipt of the redirection message including the allocated URI, the user agent 10 then transmits an INVITE message 23 to the URI. The URI identifies the reserved conference resource 13, and responsive to receiving the INVITE message 23, the resource 13 sends an acknowledgement, such as a 200 OK message 24, back to user agent 10.

Once user agent 10 receives the 200 OK message, the first user can then refer the allocated URI to a second user at user agent 11. A further message, such as a SIP REFER message 25, including the URI is transmitted from user agent 10 to user agent 11. The REFER could suitably take the form:
REFER sip:user_b@pp.radiolinja.fi SIP/2.0 with the following header:
Refer-To: sip:DKLSKX87KKJ989SHFKJH@conference.sonera.fi;
Method=INVITE Alternatively, the URI could be sent from the first user to the second user in another way.

By the above mechanism, a user can reserve a conference resource on the fly. Without any significant input on the part of the user, other participants can be connected together to form a conference call.

In response to receiving the REFER message from user agent 10, user agent 11 transmits an acknowledgement, such as a 202 accepted message 26, back to user agent 10.

User agent 11 now transmits a request message, such as an INVITE message 27, to the reserved resource 13, in response to which the resource 13 sends an acknowledgement, such as a 200 OK message 28, to user agent 11. The server 12 and resource 13 are able to communicate with each other. In this way, the server can acquire authentication information obtained by the resource from a user so that each user can be authenticated before being allowed to join the conference.

For example, it may be desirable to check that a user has a subscription enabling him to take part in conferences. Details of subscriptions could be contained in authentication information. Alternatively, or additionally, a user may be required to input a PIN for transmission to the resource 13 to confirm his identity for security reasons.

Following message 28, an acknowledgement, such as a NOTIFY message 29 with response code 200 OK, is sent from user agent 11 to user agent 10, and the conference may begin.

It will be apparent that user agent 10 can also send or REFER the dynamic URI to a number of other users so that they can take part in the conference. A further alternative is that the REFER message 25 could be directed to the conference URI. In other words, instead of referring user B to the conference, the conference could be referred to user B. The same set of messages could be used as described above, but in this case they are used with dial-out semantics.

A summary of the messages required to set up a conference according to a preferred embodiment of the invention is given below.

| | |
|---|---|
| 21 | INVITE to sip:conferences@sonera.fi |
| 22 | 3xx redirection including dynamic URI |
| 23 | INVITE to URI |
| 24 | 200 OK |
| 25 | REFER to UA 11 |
| 26 | 202 accepted |
| 27 | INVITE to URI |
| 28 | 200 OK |
| 29 | NOTIFY with response code 200 OK |

The mechanism described above can also facilitate dial-in conferences. In the dial-in case, the mechanism would function in essentially the same manner as described above except that the conference URI would he delivered to prospective participants in a different way, for example via an Instant Message or email, rather than using a REFER message to invite them.

Figure 4:
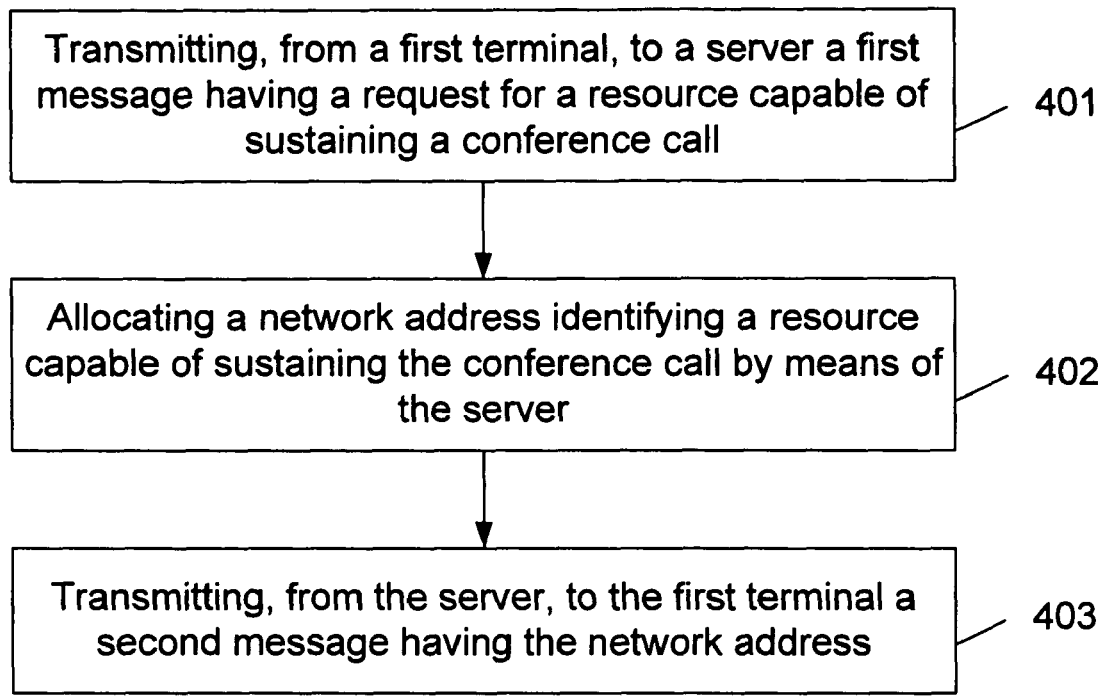
FIG. 4 illustrates a flow chart presenting steps for administering conferencing resources in a communications system.
Figure 5:
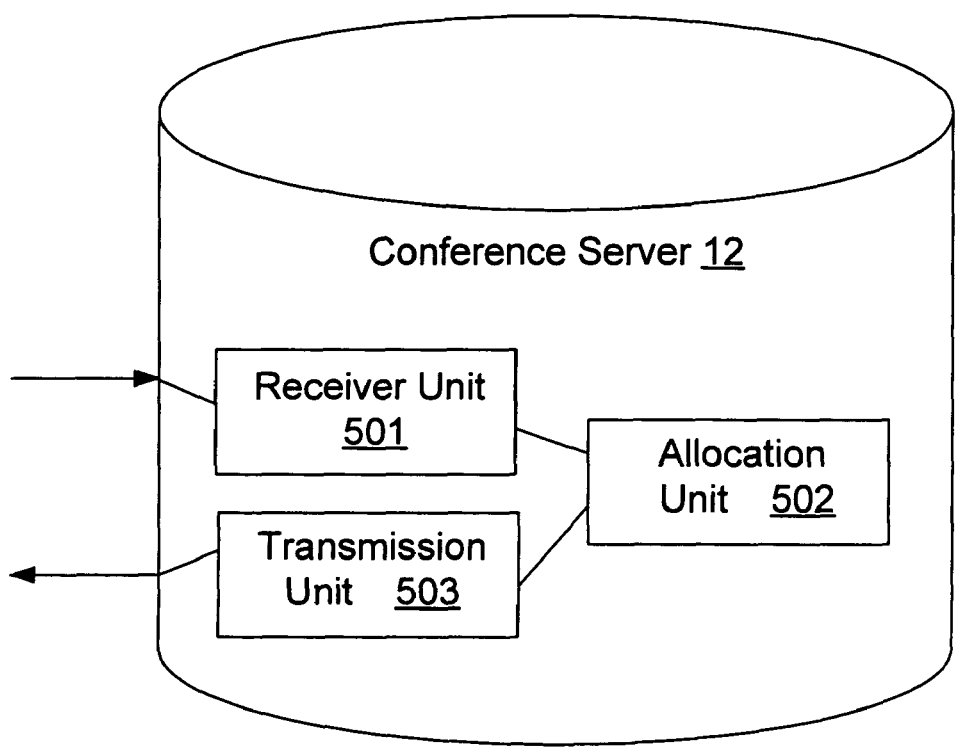
FIG. 5 shows the elements of the conference server, according to one embodiment of the invention.

As illustrated in FIG. 4, the process of administering conferencing resources in a communications is provided, for at least one embodiment of the present invention. As described above, first message is transmitted to a server, requesting a resource capable of sustaining a conference call, in step 401. Thereafter, the server allocates a network address identifying a resource capable of sustaining a conference call, in step 402. The server transmits a second message to the first terminal having the network address, in step 403. The component units that provide the above discussed functionality are illustrated in FIG. 5, namely the Receiver Unit 501, the Allocation unit 502 and the Transmission Unit 503.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. A method, comprising:
transmitting from a first terminal to a conference server a first message comprising a request for a resource capable of sustaining a conference call;
receiving by the first terminal from the server a second message comprising a network address identifying the resource capable of sustaining the conference call which has been allocated by the server;
after receiving the second message, transmitting a first request from the first terminal directly to the resource at the network address;
after receiving an acknowledgement of the first request directly from the resource, transmitting from the first terminal to at least one other terminal a third message comprising the network address; and
after receiving a notification that the resource sends out directly to the at least one other terminal an acknowledgement of a second request directly sent from the at least one other terminal, causing at least in part by the first terminal a connection from the first terminal to the at least one other terminal via the resource to establish a conference call between the first terminal and said at least other terminal,
wherein the third message comprising the network address is transmitted from the first terminal to the at least one other terminal by direct communication.

2. The method according to claim 1, wherein the transmitting the third message further comprises transmitting from the first terminal to at least two other terminals the third message comprising the network address, and wherein the initiating further comprises initiating a connection from the first terminal to the network address to establish the conference call between the first terminal and the said other terminals.

3. The method according to claim 1 wherein the first, second and third messages are session initiation protocol messages.

4. The method according to claim 1 wherein in the transmitting from a first terminal to the server, the first message is an INVITE message.

5. The method according to claim 1 wherein in the receiving from the server, the second message is a redirection message.

6. The method according to claim 1, wherein in the transmitting from the first terminal to at least one other terminal, the third message is a REFER message.

7. The method according to claim 1, wherein, the network address is a uniform resource identifier.

8. An apparatus, comprising:
at least one processor; and
at least one memory including computer program code,
the at least one memory and the computer program code configured to, with the at least one processor, cause the apparatus which is a first terminal to perform at least the following,
transmit to a conference server a first message comprising a request for a resource capable of sustaining a conference call;
receive from the server a second message comprising a network address identifying the resource capable of sustaining the conference call which has been allocated by the server;
after receiving the second message, transmit a first request directly to the resource at the network address;
after receiving an acknowledgement of the first request directly from the resource, transmit to at least one other terminal a third message comprising the network address; and
after receiving a notification that the resource sends out directly to the at least one other terminal an acknowledgement of a second request directly sent from the at least one other terminal, cause at least in part a connection from the first terminal to the at least one other terminal via the resource to establish a conference call between the first terminal and said at least other terminal, wherein the third message comprising the network address is transmitted from the first terminal to the at least one other terminal by direct communication.

9. The apparatus according to claim 8, wherein the apparatus is further caused to transmit the third message to at least two terminals, and to cause at least in part a connection from the apparatus to the network address to establish the conference call between the apparatus and the terminals.

10. The apparatus according to claim 8 wherein the apparatus is further caused to transmit the first and third messages as SIP messages.

11. The apparatus according to claim 8 wherein the apparatus is further caused to transmit the first message as an INVITE message.

12. The apparatus according to claim 8 wherein in the apparatus is further caused to receive, from the server, the second message as a redirection message.

13. The apparatus according to claim 8, wherein the apparatus is further caused to transmit, to at least one terminal, the third message as a REFER message.

14. The apparatus according to claim 8, wherein the network address as a uniform resource identifier.

15. A method, comprising:
receiving from a first terminal at a server a first message comprising a request for a resource capable of sustaining a conference call;
allocating by the server a network address identifying a resource capable of sustaining the conference call;
transmitting from the server to the first terminal a second message comprising the network address that identifies the resource capable of sustaining the conference call,
receiving directly by the resource at the network address a first request from the first terminal that has transmitted the second message;
sending an acknowledgement of the first request directly from the resource to the first terminal;
receiving by the resource a second request directly from the at least one other terminal that has received from the first terminal a third message comprising the network address;
sending an acknowledgement of the second request directly from the resource to the at least one other terminal; and
causing at least in part by the resource a connection from the first terminal to the at least one other terminal therethrough to establish a conference call between the first terminal and said at least other terminal,
wherein the third message comprising the network address is transmitted from the first terminal to the at least one other terminal by direct communication.

16. The method according to claim 15, wherein the first and second messages are session initiation protocol messages.

17. The method according to claim 15, wherein the first message is an INVITE message.

18. The method according to claim 15, wherein the second message is a redirection message.

19. A system comprising:
a server and a resource,
the server comprising at least one processor; and
at least one memory including computer program code,
the at least one memory and the computer program code configured to, with the at least one processor, cause the server to perform at least the following,
receive from a first terminal a first message comprising a request for a resource capable of sustaining a conference call;
allocate a network address identifying a resource capable of sustaining the conference call; and
transmit to the first terminal a second message comprising the network address that identifies the resource capable of sustaining the conference call,
the resource comprising at least one processor; and
at least one memory including computer program code,
the at least one memory and the computer program code configured to, with the at least one processor, cause the server to perform at least the following,
receive directly at the network address a first request from the first terminal that has transmitted the second message;
send an acknowledgement of the first request directly to the first terminal;
receive a second request directly from the at least one other terminal that has received from the first terminal a third message comprising the network address;
send an acknowledgement of the second request directly to the at least one other terminal; and
causing at least in part a connection from the first terminal to the at least one other terminal therethrough to establish a conference call between the first terminal and said at least other terminal,
wherein the third message comprising the network address is transmitted from the first terminal to the at least one other terminal by direct communication.

20. The apparatus according to claim 19, wherein the messages are session initiation protocol messages.

21. The apparatus according to claim 19, wherein the first message is an INVITE message.

22. The apparatus according to claim 19, wherein the second message is a redirection message.

23. The method according to claim 1, wherein the conference call is established in an ad hoc manner.

24. The apparatus according to claim 8, wherein the conference call is established in an ad hoc manner.

25. The method according to claim 15, wherein the conference call is established in an ad hoc manner.

26. The method according to claim 15, wherein the network address is a dynamically generated uniform resource identifier.

27. The system according to claim 19, wherein the conference call is established in an ad hoc manner.

28. The system according to claim 19, wherein the network address is a dynamically generated uniform resource identifier.

29. A method, comprising:
receiving directly by a resource capable of sustaining a conference call and reachable at a network address a first request from a first terminal that requests a server for a resource capable of sustaining a conference call and receives the network address identifying the resource;
sending an acknowledgement of the first request directly from the resource to the first terminal;
receiving by the resource a second request directly from the at least one other terminal that has received from the first terminal a message comprising the network address;
sending an acknowledgement of the second request directly from the resource to the at least one other terminal; and
causing at least in part by the resource a connection from the first terminal to the at least one other terminal therethrough to establish a conference call between the first terminal and said at least other terminal, wherein the message comprising the network address is transmitted from the first terminal to the at least one other terminal by direct communication.

30. The method according to claim 29, wherein the message is a session initiation protocol message.

31. The method according to claim 29, wherein the network address is a dynamically generated uniform resource identifier.

32. The method according to claim 29, wherein the conference call is established in an ad hoc manner.

33. An apparatus, comprising:
at least one processor; and
at least one memory including computer program code,
the at least one memory and the computer program code configured to, with the at least one processor, cause the apparatus capable of sustaining a conference call and reachable at a network address to perform at least the following,
receive directly a first request from a first terminal that requests a server for a resource capable of sustaining a conference call and receives the network address identifying the resource;
send an acknowledgement of the first request directly to the first terminal;
receive a second request directly from the at least one other terminal that has received from the first terminal a message comprising the network address;
send an acknowledgement of the second request directly to the at least one other terminal; and
cause, at least in part, a connection from the first terminal to the at least one other terminal therethrough to establish a conference call between the first terminal and said at least other terminal,
wherein the message comprising the network address is transmitted from the first terminal to the at least one other terminal by direct communication.

34. The apparatus according to claim 33, wherein the message is a session initiation protocol message.

35. The apparatus according to claim 33, wherein the network address is a dynamically generated uniform resource identifier.

36. The apparatus according to claim 33, wherein the conference call is established in an ad hoc manner.

* * * * *